United States Patent [19]
Meyn et al.

[11] Patent Number: 5,718,636
[45] Date of Patent: Feb. 17, 1998

[54] RETHREADER TOOL

[76] Inventors: Michael R. Meyn, P.O. Box 11; John David Sistrunk, III, P.O. Box 271, both of Scurry, Tex. 75158

[21] Appl. No.: 662,915

[22] Filed: Jun. 13, 1996

[51] Int. Cl.$^6$ ................................................. B21J 13/02
[52] U.S. Cl. .......................................... 470/203; 470/198
[58] Field of Search .................................. 470/198, 199, 470/200, 201, 202, 203, 204, 207

[56] References Cited

U.S. PATENT DOCUMENTS

| | | | |
|---|---|---|---|
| 1,075,753 | 10/1913 | Bastiar et al. | 470/203 |
| 4,661,028 | 4/1987 | Sanger | 470/203 |
| 5,259,706 | 11/1993 | Gaut | 470/198 |
| 5,281,059 | 1/1994 | Stuckle | 470/201 |
| 5,579,689 | 5/1971 | Ferkovich | 470/199 |

FOREIGN PATENT DOCUMENTS 8800103  1/1988  WIPO ................................. 470/198

Primary Examiner—Lowell A. Larson
Assistant Examiner—Ed Tolan

[57] ABSTRACT

A rethreader tool for use in a internally threaded hole of which the internal thread pattern is in need of repair. The assembly providing a expandable, collapsible and reusable device for achieving the purposes of the internal thread repair. In the collapsed state the rethreader finger section of the base can be inserted into the damaged thread pattern of the hole without making contact with undamaged internal threads therein. The application of mechanical means expands to the rethreader finger section to the exact diameter of the hole. During the expansion process the internal thread pattern of the hole and threading pattern of the rethreader finger section seat together. Rotation of the expanded rethreader finger section in the hole repairs the internal thread pattern of the hole to its original specified pattern. After completion of the rethreading process the rethreader finger section is collapsed by mechanical means and withdrawn from the internally threaded hole.

12 Claims, 3 Drawing Sheets

RETHREADER TOOL

RETHREADER TOOL

RETHREADER TOOL

FIELD OF INVENTION

This invention relates to a expandable, contractible and reusable Rethreader Tool. Specifically a rethreader tool that will start the rethreading process in undamaged threads within a internally threaded hole.

BACKGROUND OF THE INVENTION

The use of softer materials in the manufacturing of machinery, auto-mobile engines, and many other tooled or machined items has become a fact. It has become apparent that the hole threads in these items are often a much softer material than the objects that screw into the internally threaded holes, such as bolts, spark plugs or others circular and threaded objects.

It is not uncommon that the softer threads in the hole on these items become damaged when inserting, tightening or removing these objects. If the threading pattern in the hole of the item cannot be restored to its original pattern a replacement item may become necessary. One example of the need for the invention of the rethreader tool is the combustion engine.

With the advent of the aluminum engine block, sparkplug holes are now threaded with the softer aluminum metal. It is not uncommon to damage these threads when inserting, tightening or removing sparkplugs. The damage to the threads normally accures at the upper part, sparkplug entry point, in the sparkplug hole. Once the threads are damaged or cross-threaded, the standard procedure to repair the sparkplug hole is by one of the following means:

1) Existing Solid Taps
   a) Attempt to rethread by entering the damaged hole at the entry point where the threads are damaged with a tap, then screwing the tap inward from that point. This procedure often causes additional damage by establishing a different pattern to the damaged threads and the possibility of forcing metal shavings into the engine block.
   b) Taking off the engine head and starting the taps from the undamaged threads at the base of the sparkplug hole. Screwing the tap in from this position repairs the damaged threads in line with the existing thread design. However this procedure is time consuming and labor intensive.
2) The helicole insert has been designed to insert a spring in the sparkplug hole after the existing threads have been drilled out or tapped. This procedure attempts to create a new threading system attached to the walls of the sparkplug hole, but does not repair the original threading system.

The existing rethreading tools or taps are designed to start the rethreading process from the object entry point into the hole. A problem occurs with this process when the damaged threads are at the entry point of the hole. By starting the rethreading process in damaged threads, often a new thread pattern is initiated in the damaged portion of the hole. When the undamaged threads are reached then two unmatched patterns exist in the hole. Continuing to attempt to establish a new pattern throughout the length of the hole will damage the remaining threads by forcing them in line with the new pattern. The new pattern can result in weaker threads than those that were originally threaded in the hole. By means of our invention, these and other problems encountered using prior art rethreaders or taps are substantially reduced.

SUMMARY OF THE INVENTION

It is an object of our invention to provide an improved tool for rethreading existing internally threaded holes that have become damaged.

Another object of the invention is to provide a rethreading tool that will start the rethreading process by matching the threads of the rethreader tool to the undamaged threads that remain in the hole.

Yet another object of the invention is to complete the rethreading process without realigning and weakening the undamaged original threads.

It is a further object of our invention that the rethreading process can be accomplished by one person without the need of electrical power tools.

Briefly, our invention has an expandable and contractible exterior threaded finger section of the rethreader tool which is controlled mechanical means. The threaded finger section is designed to recur, mold and conform damaged threads into repaired threads. The threaded finger section will insert into a threaded hole, when in the collapsed state, with limited contact to the remaining undamaged threads. When expanding the base of the threaded finger section in the hole the fingers will expand to the exact diameter of the hole and match the undamaged threads of the hole. The threaded section of the tool will not expand beyond the diameter of the hole. After expanding and matching the undamaged threads in the hole, the tool can then be rotated to screw into the hole and or reverse out of the hole.

When rotating the tool matched with the undamaged threads, three things occur that repair the damaged threads.

1. The sharp edges along the slits that divide the rethreader finger sections cuts material of the damaged threads obstructing the hole.
2. The cut material enters the grooved section of the rethreaded finger section.
3. By the continued contact and rotation of the threaded finger section with the undamaged and repaired threads the cut material is reshaped into the pattern of the existing undamaged threads.

After rethreading the hole the object intended to be threaded or screwed into the threaded hole can then be started in the intended thread pattern. Once the object has initiated proper entrance into the hole thread pattern it can then continue on its path through the hole threading pattern. When completely inserted into the required depth of the hole, the objects threads will be in contact with reformed and original undamaged threads.

After completion of the rethreading process the invention can be reversed out of the hole or collapse to a size that the rethreader finger section does not make contact with the threads of the hole and then withdrawn.

These and other objects, features and advantages of the present invention will become apparent to those skilled in the art from the following description and attached drawings. By way of example only a preferred embodiment of the invention is described and illustrated.

DETAILED DESCRIPTION OF THE PREFERRED EMBODIMENT

Figure 1:
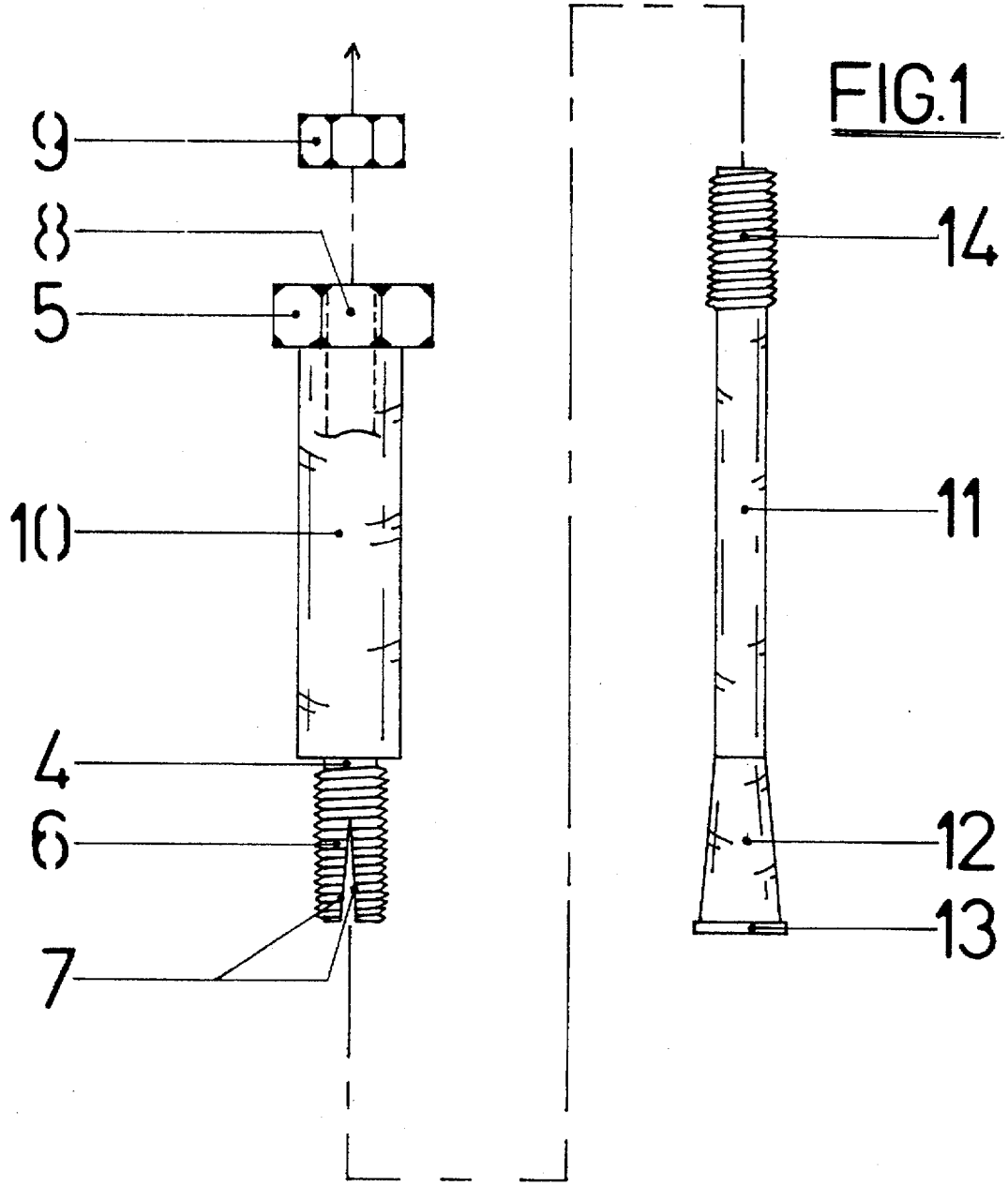
FIG. 1 shows a perspective view of an rethreader tool, a tapered shaft for expanding the slitted rethreader finger section of the base and a hex nut that when rotated on the upper shaft threaded pattern provides a mechanical means of drawing the tapered section of the shaft into the base, thus illustrating a preferred embodiment of our invention.

Referring now the drawn figures there is shown, in a preferred embodiment of our invention, an expandable, collapsible and reusable rethreader tool, which includes, in FIG. 1, a elongated base 10 having a bottom section 4 which is smaller in diameter than the remainder of base 10. The bottom section has an expandable exterior threaded section 6 being the rethread finger section. The end portion of the threaded section 6 contains a series of equally circumferentially spaced apart slits 7 which extend longitudinally from the open bottom section 4 beyond the rethread finger section 6. The base 10 having a upper section 5 comprising a hex which is larger than the cylindrical middle of the base 10. The base 10 has an elongated cavity 8 which extends there through and is co-axial. The cavity 8 receives a shaft 11 there through which has a threaded upper section 14 that when inserted protrudes beyond the hex 5. The lower section of the circular shaft 11 contains a tapered area 12 which tapered at a constant rate. At the base 10 of the tapered section 12 is a circular lip 13 which protrudes beyond the tapered section 12. When shaft 11 is inserted into base 10 the tapered section 12 makes contact with the rethreader finger section 6. The tapered section 12 exceeds the diameter of cavity 8 at rethreader finger section 6. After shaft 11 has been inserted in the base 10 beyond hex 5, hex nut 9 is rotated clockwise onto the shaft threads 14 until the point where the tapered section 12 is drawn into base bottom 4. As tapered section 12 is drawn into cavity 8 the slits 7 in threaded finger section 6 spreads an equal distance until such point that lip 13 comes into contact with the expanded rethread finger section 6 establishing the total expansion size of base bottom 4 and rethread finger section 6 to an exact size.

Figure 2:
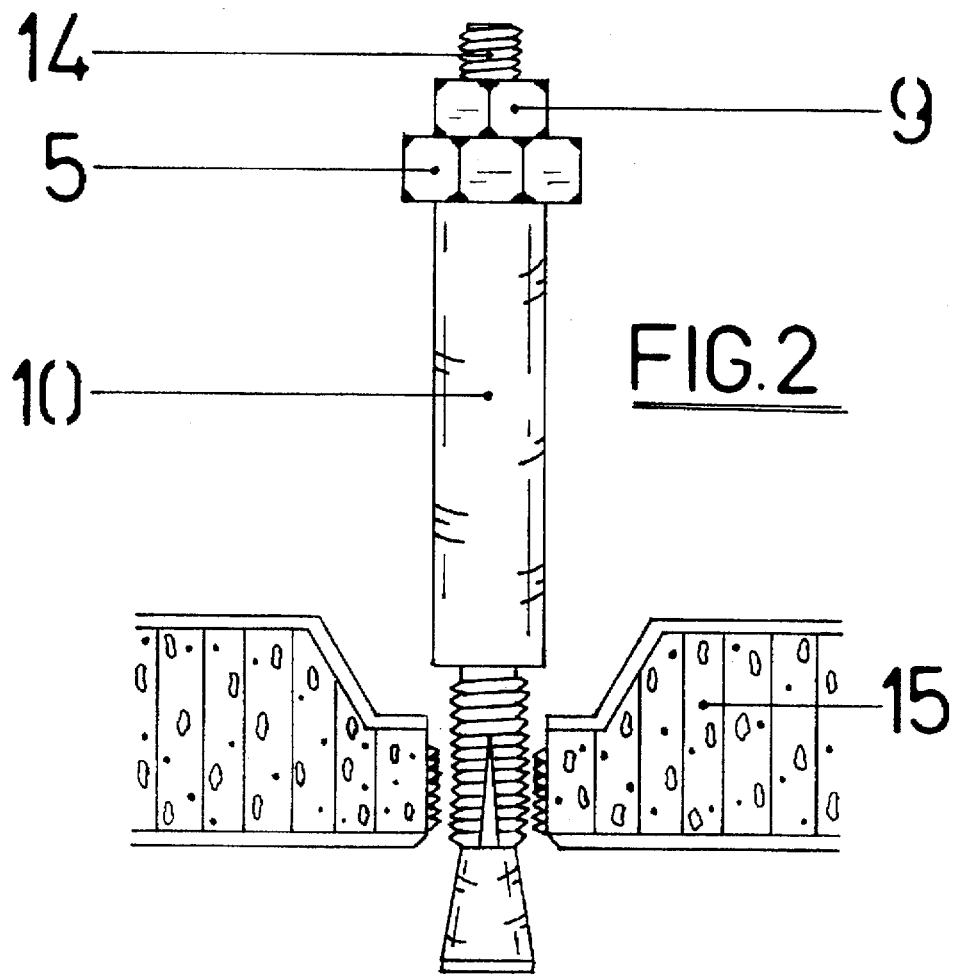
FIG. 2 shows a cross-section view of the assembled rethreader tool of FIG. 1 inserted into a sparkplug hole in the head of a combustible engine block with the rethreader finger section in a collapsed state.
Figure 2A:
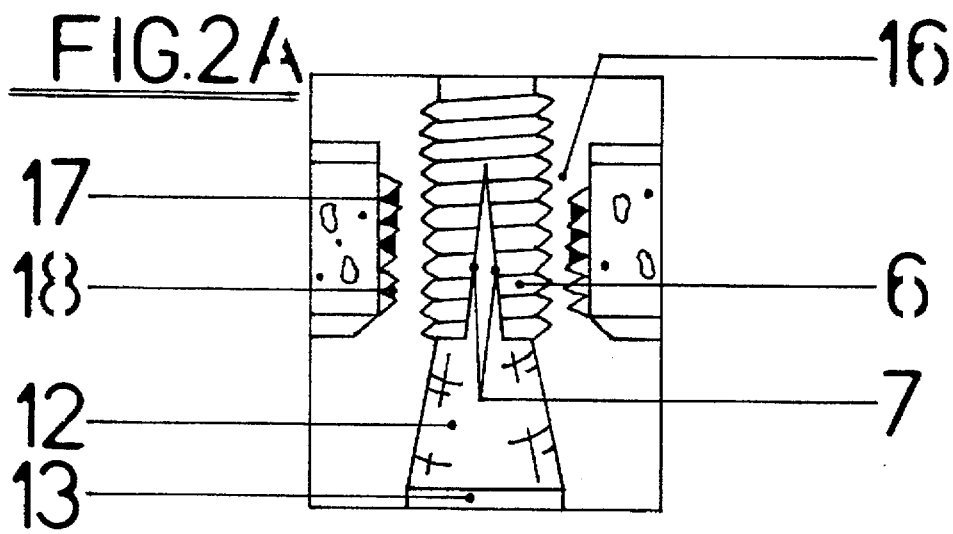
FIG. 2A shows a blown up view of the lower part of the invention.

FIG. 2 demonstrates the collapsible rethreader FIG. 6 inserted into sparkplug hole 16 within a combustion engine block 15. The undamaged sparkplug threads 18 in the bottom of the sparkplug hole 16 are by-passed during the insertion along with the damaged threads 17 in the top of the sparkplug hole 16. The tapered end 12 of the shaft 11 extends beyond engine head 15. Slits 7 are together during the collapsed rethreader finger section 6 configuration.

Figure 3:
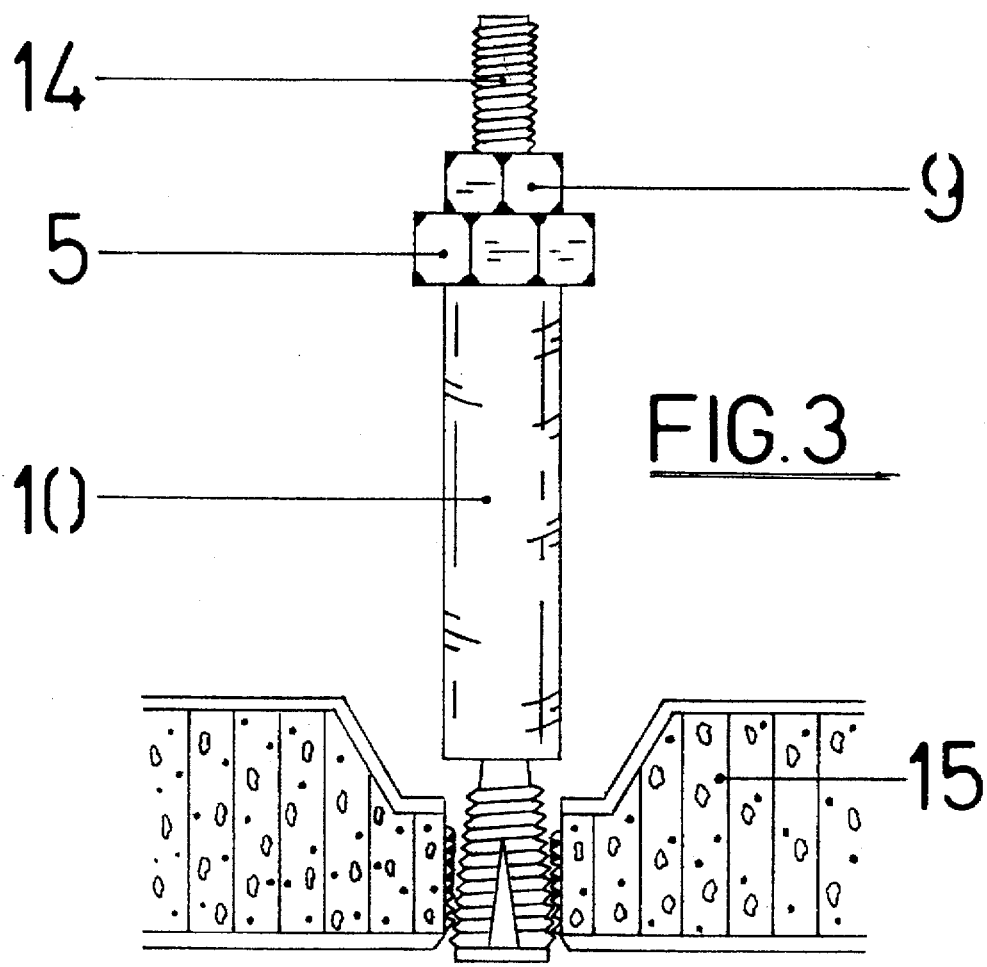
FIG. 3 shows the cross-section view of FIG. 2 with the rethreader finger section expanded to the exact dimensions of the sparkplug hole and the threading patterns of the sparkplug hole seated against those of the rethreader finger section.
Figure 3A:
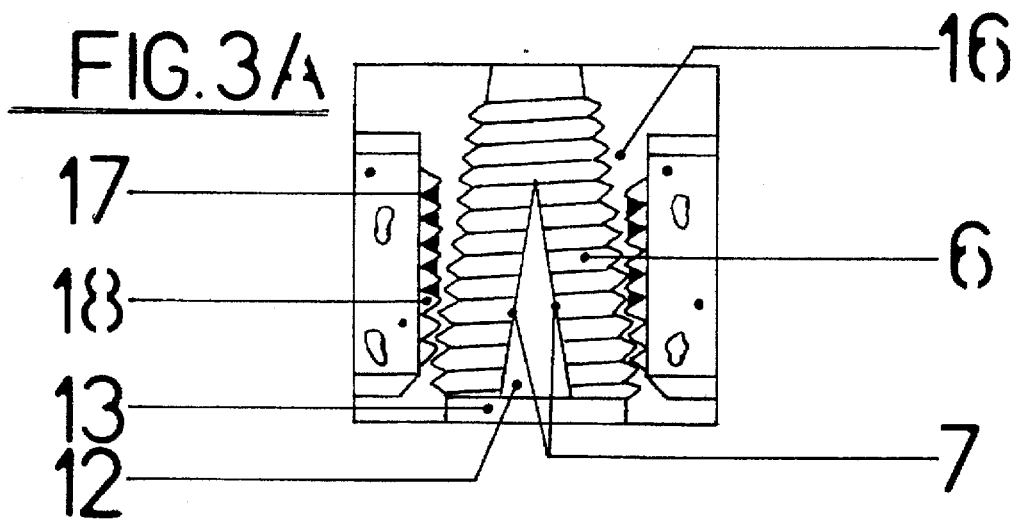
FIG. 3A shows a blown up view of the lower part of the invention.

FIG. 3 demonstrates the expanded rethreader finger section 6 matching the pattern of the undamaged thread 18 in the bottom of sparkplug hole 16. The action of rotating hex nut 9 draws the tapered shaft section into rethreader finger section 6 thereby creating a separation of slitted sections 7 allowing the expansion. As the rethreader finger section expanded the undamaged threads 18 in the sparkplug hole 16 correlates the threads on the rethreader finger section 6 with the existing thread pattern 18. When circular lip 13 contacts rethreader finger section 6, the expansion is at its maximum, matching the exact diameter of sparkplug hole 16. Placing a torqueing device on hex 5 of the rethreader tool can be rotated in a counter clockwise direction which will reverse it out of the sparkplug hole 16. While reversing out, the threaded sections of the rethreader finger section 6 enable the expanded slits 7 sharp edges to recur the damaged sparkplug threads 17. The damaged threads 17 in sparkplug hole 16 are reestablished to the original threaded pattern 18 as the rethreader finger section 6 fully expanded is reversed completely out of sparkplug hole 16.

We claim:

1. A rethreader tool that is reusable having an expandable and collapsible rethreading section which rethreads damaged threads within a circular hole of which a threaded pattern has been manufactured to specific dimensions in accordance with the invention comprising:
    (a) a base having sufficient length to perform the required rethreading operation by a single person without the need of electrically powered tools,
    (b) said base having a lower section which is in the form of separated sections of rethreader fingers having threads and grooves which are of a pattern to match the specific dimensions of the threading pattern within the hole that is to be rethreaded and having slits that are co-axial thereto,
    (c) said base having a middle section which elongates the base and separates the lower and upper section,
    (d) said base having a upper section which is of a form to accommodate a torqueing device,
    (e) the base having a cavity that extends therethrough which is co-axial with the longitudinal axis thereof,
    (f) a shaft longer in length than the base which slidably is positioned within the co-axial cavity of the base,
    (g) said shaft having an upper section which extends beyond the upper section of the base and having means for attaching a torqueing device which draws the lower section of the shaft into the base,
    (h) the shaft having a middle section which adds longitudinal length and separation between the upper section and lower section,
    (i) said lower section having two component shapes which terminate at the bottom of the shaft:
        (1) the section below the middle section having a predetermined rate of expansion,
        (2) the bottom of the shaft having a lip extending, beyond the expanded section of the shaft,
        (3) the lower section of the shaft when drawn into the lower section of the base expands to an exact diameter occurring when the lip of the shaft comes into contact with the lower section of the base.

2. The rethreader tool of claim 1 wherein said cavity within the lower section of the base is smaller in diameter than the expanded lower section of the shaft.

3. The rethreader tool of claim 1 of wherein said slits in the lower section of the base allow for the expansion thereof.

4. The rethreader tool of claim 1 wherein the lower section of the shaft and base rethreader finger section in a collapsed state to be inserted into a hole having a threaded pattern without making contact with the threads therein:
    (a) said rethreader finger section of the base having a mechanical means of expanding to the exact diameter of the hole and matching the threading pattern of the hole with the threading pattern of the rethreader finger section during the expansion process,
    (b) the enlarged slits created during the expansion establishing gaps between the hole threading pattern and that of the rethreader finger section,
    (c) a mechanical means of rotating the base and shaft within the hole.

5. The rethreader tool of claim 4 wherein the rotation of the base and shaft reformation of the original threading pattern to damaged or debris filled threads within the hole.

6. The rethreader tool of claim 1 whereby the collapse of the expanded rethreader finger section occurs when mechanical means are used to withdraw the expanded lower shaft section from the cavity of the base.

7. The rethreader tool of claim 1 constructed of a material plyable enough to be expanded when rethreading and contracted for inserting into or out of a threaded hole.

8. The rethreader tool of claim 1 constructed of a material with the rethreading threads and grooves hard enough to reshape damaged threads when rotating within the threaded hole.

9. The rethreader tool of claim 1 wherein the middle section of the base is larger in diameter than the hole to be rethreaded thereby establishing a maximum depth that the lower rethreading finger section can enter the hole.

10. The rethreader tool of claim 1 wherein the rethreader finger section is a predetermined length to establish contact when expanded with the undamaged threads within the hole.

11. The rethreader tool of claim 3 wherein the expansion process is initiated at the lower end of the rethreader finger section thereby creating the initial contact with the undamaged threading pattern within the hole by the threading pattern of the rethreader finger section.

12. The rethreader tool of claim 1 whereby the middle section of the base is of a predetermined length to allow access to damaged threaded holes located in recessed areas.

* * * * *